Patented Nov. 17, 1953

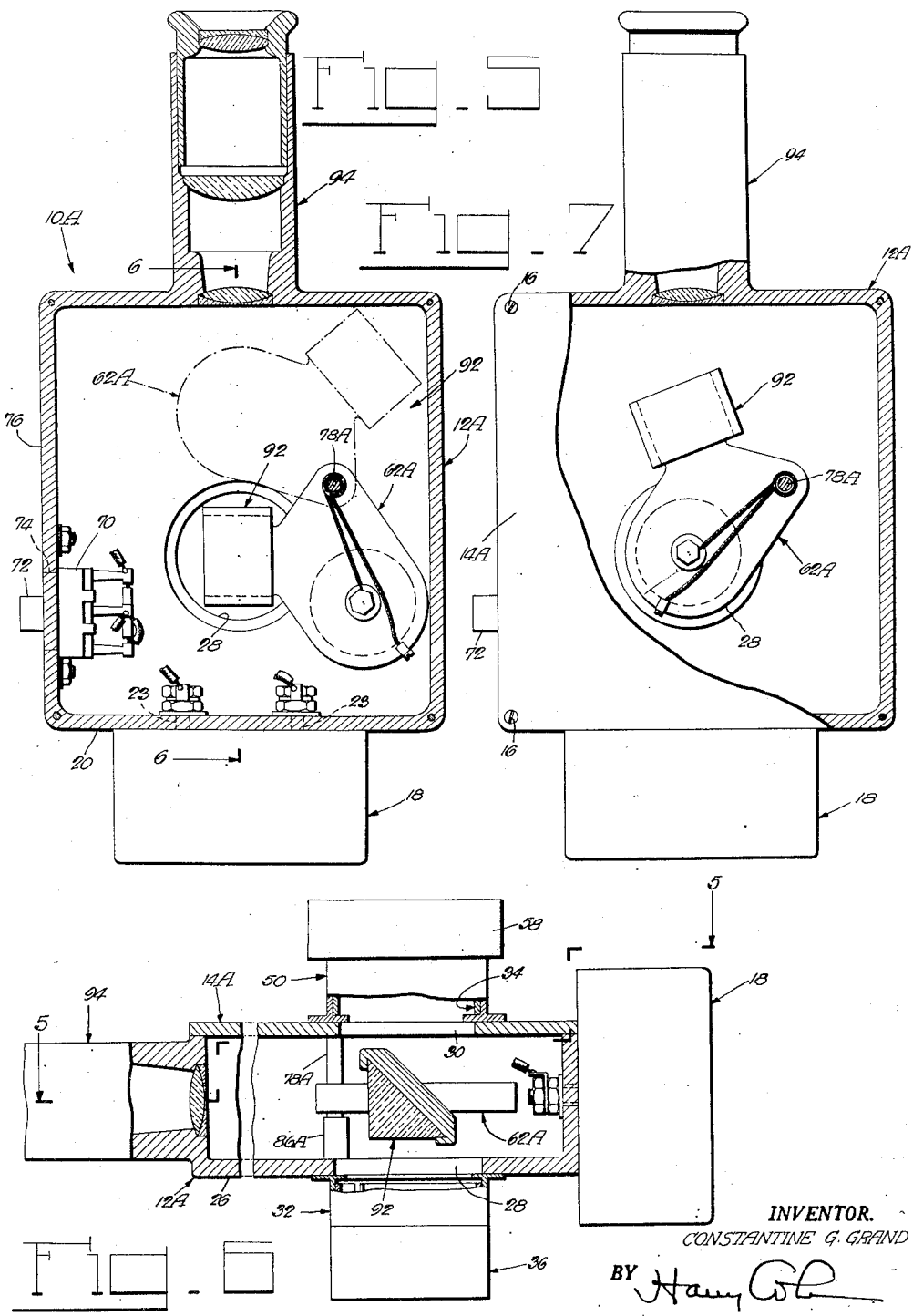

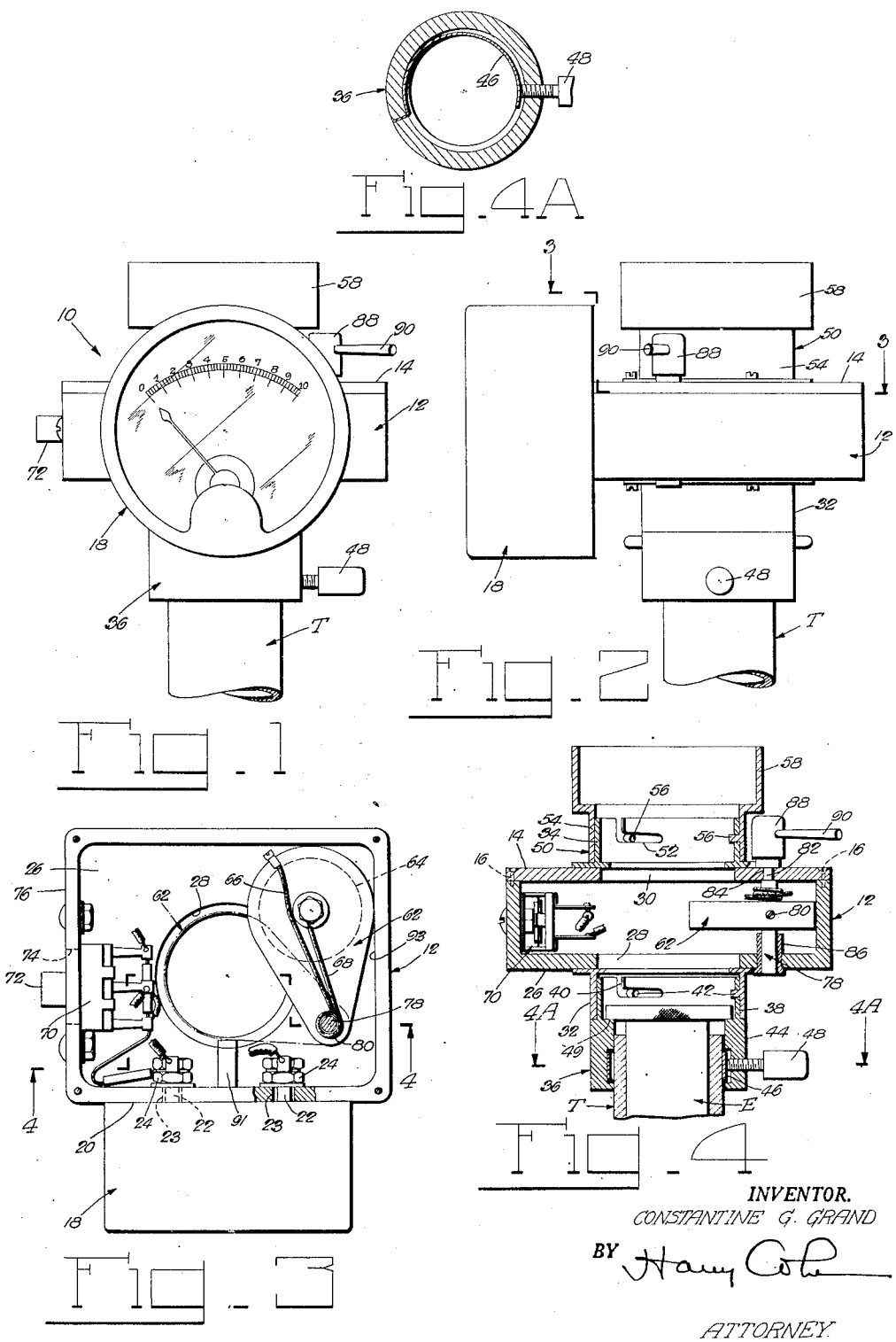

2,659,268

UNITED STATES PATENT OFFICE 2,659,268

LIGHT METER FOR MICROPHOTOGRAPHY

Constantine G. Grand, New York, N. Y.

Application December 7, 1948, Serial No. 63,910

4 Claims. (Cl. 88—40)

This invention relates generally to photography and more particularly to instruments intended primarily for use in taking micro-photographs or photographs of enlarged images.

One of the objects of the present invention is the provision of a light-measuring instrument constructed and arranged so that it can be easily placed in position on the upper end of the tube of a microscope for measuring the light passing through said tube to the lens of the camera. A further object, in this connection, is to provide an instrument which may remain in position on the tube of the microscope without interfering with the transmission of the image from the microscope to the camera.

Another object of the invention is the provision of an instrument which is well adapted to accomplish the above mentioned object of the invention and which also includes means for focussing the image so that a micro-photograph may be taken while the image is observed.

The above and other objects, features and advantages of the invention, as well as objects ancillary to the above stated objects will be fully understood from the following description considered in connection with the accompanying illustrative drawings.

In the drawings:

Fig. 1 is a front view of an instrument embodying the present invention showing the same mounted on the upper end of the tube of a microscope;

Fig. 2 is a side view of the assembly illustrated by Fig. 1;

Fig. 3 is a sectional view on the line 3—3 of Fig. 2;

Fig. 4 is a sectional view on the line 4—4 of Fig. 3;

Fig. 4A is a sectional view on the line 4A—4A of Fig. 4;

Fig. 5 is a view similar to Fig. 3 showing another form of the invention in which the instrument is provided with a focussing device, the latter being in operative position;

Fig. 6 is a sectional view on the line 6—6 of Fig. 5;

Fig. 7 is a view similar to Fig. 5, showing the photo-electric cell in operative position.

Referring now to the drawings in detail and first to the form of the invention illustrated in Figs. 1 to 4, the instrument 10 embodying the present invention comprises a casing 12 provided with a cover 14 removably secured in position in any suitable way as by screws 16. Said casing including its cover is preferably formed of electrical insulation material. An electric meter 18 of the type conventionally used in connection with photo-electrical cells of light measuring instruments is mounted on casing 12 externally thereof and in unitary relation therewith. More particularly, as here shown meter 18 abuts a side wall 20 of casing 12 and is secured in position by extending the meter terminals 22 through openings 23 in said wall 20 where they are held on the inner side of said wall by nuts 24, as illustrated in Fig. 3. The bottom 26 of casing 12 is provided with a light-inlet opening 28, and the cover or top wall 14 of said casing is provided with a light-outlet opening 30 which is in axial alignment with said opening 28. Flanged tubes 32 and 34 are secured to the bottom and top, respectively, of casing 12 in axial alignment with openings 28 and 30, providing an axial light passage through casing 12. A coupling member 36 is removably secured to tube 32. Said coupling member 36 has a tubular part 38 which slidably fits within tube 32 and has bayonet slots 40 which are engageable with pin projections 42 of tube 32 for removably securing coupling 36 to said tube. The tubular part 44 of coupling member 36 is constructed to fit on the upper end of the mocroscope tube T where it may be secured releasably in position by the spring clamping member 46 which may be pressed against the peripheral surface of the upper end of tube T by the adjustable screw 48 (Fig. 4A). Coupling member 36 has an internal peripheral shoulder 49 which provides a support for the eye-piece E of the microscope, said eye-piece unit being removed from the microscope tube and placed in position on said support. In this connection it will be understood that before mounting the casing 12 on the tube T of the microscope, the eye-piece is removed from said microscope tube and positioned in the part on coupling 36 through the open top of the latter before said part is connected to the casing part 32. A coupling member 50 is provided at the top of casing 12 being removably secured to tube 34 preferably by a bayonet slot connection as shown in Fig. 4. For this purpose, tube 34 is provided with bayonet slots 52 and coupling 50 has a tubular part 54 which slidably fits over tube 34 and is provided with pin projections 56 which engage the bayonet slots of tube 34. Coupling 50 also has a tubular part 58 through which the light passes to a camera (not shown) which may be any conventional camera for taking microphotographs.

A photo-electric cell 62 is mounted within casing 12 for movement from the retracted position shown in full lines Fig. 3 to an operative position, shown in dot and dash lines, in which the light-receiving opening 64 of said cell confronts and is in axial registry with opening 28. It will be understood that in the last-mentioned or operative position of cell 62, light which passes through tube T of the microscope impinges on the light-sensitive element of the photo-electric cell. Preferably, the cell 62 is a selenium cell. The terminals of said cell are connected by wires 66 and 68 to the terminals of the electric meter 18 and to a resistance device 70 which has a movable switching knob 72 movable in a slot 74 in a side wall 76 of casing 12. Said resistance is preferably of predetermined value and is arranged in shunt relation to the meter to by-pass current from the photo-electric cell whereby to prevent over-deflection of the meter pointer when the light from the source is of such high intensity as to produce such over-deflection. The resistance may be connected and disconnected from the cell and meter circuit by operating said switching knob 70. It will be understood that the meter dial readings will be multiplied by an appropriate numerical factor when the resistance is connected in the cell and meter circuit. The means for mounting the photo-electric cell 62 in casing 12 comprises a spindle 78 to which the frame of said cell is secured in any suitable way as by a set screw 80. Spindle 78 is carried by cover 14 and has a portion 82 which is journalled for rotation in a bearing opening 84 provided in said cover. The lower end of spindle 78 is journalled for rotation in a bearing member 86 secured in the bottom wall 26 of casing 12. The arrangement is such that when cover 14 is unfastened and removed from casing 12 the cell 62 together with spindle 78 is removable from the casing as a unit with said cover. When cover 14 is in position, cell 62 being within the casing 12, said cell may be readily turned from the retracted position illustrated in Fig. 3 to the abovementioned operative position of said cell by means accessible externally of said cell. For this purpose a cap 88 is fastened to the upper end of spindle 78 and an arm or finger piece 90 is secured to said cap, providing a convenient means for turning spindle 78 whereby to move the cell 62 to its operative and retracted positions. A stop pin 91 is provided on the interior of casing wall 20 to engage the side edge of the cell 62 when the latter is in its projected or operative position shown in dot and dash lines in Fig. 3. Said stop pin 91 thus limits the movement of said cell in a counter-clockwise direction, viewing Fig. 3, and constitutes means to determine the correct operative position of said cell. The side wall 93 of the casing acts as a stop for cell 62 in the retracted position thereof.

Thus it will be understood that the instrument embodying the present invention may be mounted on the microscope and thus positioned in relation to the microscope and the camera when it is desired to take a micro-photograph so that the light may be measured and the camera adjusted in accordance with the meter reading, while the meter and the camera are in assembled relation with the microscope. Further, it will be readily understood that the magnified image which is to be photographed is transmitted through the microscope tube T and the casing 12 to the camera without interference by the photo-electric cell 62 when the latter is in the retracted position thereof shown by Fig. 3, so that the photograph may be taken without disturbing the assembly.

Referring now to the instrument 10A illustrated by Figs. 5 to 7, said instrument is in general of the same construction as the instrument 10 illustrated by Figs. 1 to 4 but is in addition provided with a prism or other light-reflector 92, for focussing purposes, and with a viewing tube 94 provided with suitable lenses as indicated. The reflector 92 is mounted in unitary relation with the selenium or photo-electric cell 62A which is otherwise the same as the cell 62 hereinbefore described with reference to Figs. 1 to 4. Said cell and said prism 92 are mounted in unitary relation for turning movement within casing 12A which corresponds to casing 12, the mounting being substantially the same as that provided for cell 62 in casing 12. For this purpose the spindle 78A is mounted on the casing cover 14A in the same way as spindle 78, the lower end of said spindle being journalled for turning movement in bearing member 86A carried by the bottom 26 of the casing. It will be understood that the upper end of the spindle 78A is provided with operating means such as cap 88 and arm 90 hereinbefore described with reference to Figs. 1 to 4. In the full-line position of the reflector 92 illustrated in Figs. 5 and 6, the light from the microscope which enters the casing 12A through opening 28 is reflected to the viewing tube 94. In the position illustrated in Fig. 7, the photo-electric cell 62A is in registry with light-inlet opening 28 of casing 12A for obtaining a light-measuring reading on meter 18. When the unitary devices 62A and 92 are moved to the retracted position illustrated by dotted lines in Fig. 5, the passage of light from light-inlet opening 28 through light-outlet opening 30 to the camera (not shown) is unobstructed so that the photograph may be taken without disturbing the assembly of the instrument in relation to the microscope and camera. The prism 92 may be a split prism of a known type which allows some of the light to pass through to the camera while some of the light is at the same time reflected through the viewing tube 94, whereby to enable the photograph to be taken at the instant the image is observed through the viewing tube 94.

Thus it will be noted that the instrument 10A illustrated by Figs. 5 to 7 is, like the instrument 10, well adapted to be assembled with the microscope and camera to provide for measuring the light which passes through the tube of the microscope, but in addition instrument 10A also provides for the convenient focussing of the image by observation of the latter through the viewing tube 94. In this connection it will be understood that by reason of the provision of the lenses in the viewing tube 94, the object to be photographed may be observed through said viewing tube in the same relation as the image produced by the camera lens on the film in the camera (not shown). Also it will be understood that the adjustment means of the microscope is utilized in the usual way for focussing purposes, both in the case of instrument 10 and in the case of instrument 10A. With reference to instrument 10A, it will be understood that the covering of casing 12A may be provided with marks or indicia (not shown) in juxtaposition to cap 88 or handle 90 for indicating the positions of prism 92 and photo-electric cell 62A in said casing.

The instrument may be used not only for micro-photography but also for measuring light densities and light-transmissions of photographic and other films, of colors, solutions, histological tissues, etc., particularly through a microscope.

It will be understood that various changes in the details of construction and in the form and arrangement of parts may be made without departing from the underlying idea or principles of my invention within the scope of the appended claims.

Having thus described my invention, what I claim and desire to secure by Letters Patent, is:

1. In an instrument of the character described, a casing having a bottom wall provided with a light-inlet opening and a top wall spaced from said bottom wall and provided with a light-outlet opening in registry with said inlet opening, said bottom wall having a part adapting said casing to be secured to the upper part of the tube of a microscope with said light inlet opening of said casing in registry with said tube, a photo-electric cell movably mounted in said casing and movable in the space between said walls to and from a projected position in which said cell is disposed between said openings and subjected to the action of light entering said casing from the microscope tube, through said inlet-opening, and to and from a retracted position in which said cell is clear of the path of light from said inlet-opening to said outlet opening, said casing having a viewing tube in communication with the interior of said casing, and a light-reflector movably mounted in said casing and movable therein to and from a projected position in which light entering said casing through said light-inlet opening is reflected by said reflector through said viewing tube, and to and from a retracted position in which said reflector is clear of the path of light entering said inlet-opening, said photo-electric cell and said light-reflector being mounted side-by-side in said casing in unitary relation, and means accessible externally of said casing for selectively moving said cell and said reflector to their said projected and retracted positions whereby, when said cell is disposed in said path of light, said reflector is clear thereof, and when said reflector is disposed in said path of light, said cell is clear thereof.

2. In an instrument of the character described, a casing having a bottom wall provided with an unimpeded light-inlet opening and a top wall spaced from said bottom wall and provided with an unimpeded light-outlet opening in registry with said inlet opening, a spindle mounted in said casing for turning movement about its own axis in position parallel to the axis of said openings but spaced laterally therefrom, a photo-electric cell carried by said spindle internally of said casing and positioned transversely of said spindle for movement in the space between said walls to and from a projected position in which said cell is disposed between said openings and subjected to the action of light entering said casing from a microscope tube, through said inlet-opening, and to and from a retracted position in which said cell is clear of the path of light from said inlet-opening to said outlet opening, said casing having a viewing tube in communication with the interior of said casing, a light reflector carried by said spindle and movable in said casing to and from a projected position in which light entering said casing through said light-inlet opening is reflected by said reflector through said viewing tube, and to and from a retracted position in which said reflector is clear of the path of light entering said inlet-opening, said photo-electric cell and said light-reflector being mounted side-by-side in said casing in unitary relation, said cell and reflector also being selectively movable to a position in which both are clear of the path of light from said light-inlet opening to said light-outlet opening, and means accessible externally of said casing and connected to said spindle for turning the latter for selectively moving said cell and said reflector to said last-mentioned position and to their said projected and retracted positions whereby, when said cell is disposed in said path of light, said reflector is clear thereof, and when said reflector is disposed in said path of light, said cell is clear thereof.

3. A light measuring instrument attachment for microscopes, comprising a casing having a bottom wall provided with a fixed unimpeded light inlet opening, opening directly to the surrounding atmosphere, and a top wall spaced from said bottom wall and provided with a fixed unimpeded light outlet opening in registry with said inlet opening, said outlet opening providing an unobstructed light path to the surrounding atmosphere, said bottom wall having means for securing said casing to the upper part of the tube of a microscope with said light inlet opening of said casing in registry with said tube, a spindle mounted in said casing for turning movement about its own axis in position parallel to the axis of said openings but spaced laterally therefrom, a photo-electric cell carried by said spindle internally of said casing and positioned transversely of said spindle for movement in the space between said walls and in a plane parallel thereto, to and from a projected position in which said cell is disposed between said openings and subjected to the action of light entering said casing from a microscope tube, through said inlet-opening, and to and from a retracted position in which said cell is clear of the path of light from said inlet-opening to said outlet opening, and means accessible externally of said casing and connected to said spindle for turning the latter for moving said cell to either of said positions thereof, said top wall being removable and said spindle being secured to and removable from said casing with said top wall.

4. A light measuring instrument attachment for microscopes, comprising a casing having a bottom wall provided with a fixed unimpeded light inlet opening, opening directly to the surrounding atmosphere, and a top wall spaced from said bottom wall and provided with a fixed unimpeded light outlet opening in registry with said inlet opening, said outlet opening providing an unobstructed light path to the surrounding atmosphere, said bottom wall having means for securing said casing to the upper part of the tube of a microscope with said light inlet opening of said casing in registry with said tube, a spindle mounted in said casing for turning movement about its own axis in position parallel to the axis of said openings but spaced laterally therefrom, a photo-electric cell carried by said spindle internally of said casing and positioned transversely of said spindle for movement in the space between said walls and in a plane parallel thereto, to and from a projected position in which said cell is disposed between said openings and subjected to the action of light entering said casing from a microscope tube, through said inlet-opening, and to and from a retracted position in which said cell is clear of the path of light from said inlet-opening to said outlet opening, and means accessible externally of said casing and connected to said spindle for turning the latter for moving said cell to either of said positions thereof, said top wall being removable and said spindle being secured to and removable from said casing with said top wall, said bottom wall having a bearing part in which the lower end of said spindle is removably engaged when the spindle is in operative position in the casing.

CONSTANTINE G. GRAND.

References Cited in the file of this patent

UNITED STATES PATENTS

| Number | Name | Date |
|---|---|---|
| 1,573,401 | Heine | Feb. 16, 1926 |
| 2,330,613 | Nuchterlein | Sept. 28, 1943 |

FOREIGN PATENTS

| Number | Country | Date |
|---|---|---|
| 455,774 | Great Britain | Oct. 19, 1936 |